United States Patent
Sutterlin (10) Patent No.: US 9,510,515 B2
(45) Date of Patent: Dec. 6, 2016

(54) ROOTZONE HEATING FOR ENERGY CONSERVATION USING LATENT HEAT STORAGE

(71) Applicant: ENTROPY SOLUTIONS INC., Plymouth, MN (US)

(72) Inventor: William Rusty Sutterlin, Hoover, AL (US)

(73) Assignee: EntropySolutions LLC, Plymouth, MN (US)

(*) Notice: Subject to any disclaimer, the term of this patent is extended or adjusted under 35 U.S.C. 154(b) by 49 days.

(21) Appl. No.: 14/207,491

(22) Filed: Mar. 12, 2014

(65) Prior Publication Data

US 2014/0259912 A1  Sep. 18, 2014

Related U.S. Application Data

(60) Provisional application No. 61/798,112, filed on Mar. 15, 2013.

(51) Int. Cl.
*A01G 9/02* (2006.01)
*A01G 9/10* (2006.01)
*A01G 1/00* (2006.01)

(52) U.S. Cl.
CPC ............ *A01G 1/001* (2013.01); *A01G 9/021* (2013.01); *A01G 9/10* (2013.01); *A01G 9/1086* (2013.01)

(58) Field of Classification Search
CPC ............ C09K 17/14; G05D 1/02; G05D 9/00; A01K 9/16; A01N 25/00; A01N 25/28; A01G 9/1086; A01G 9/10; A01G 9/021
USPC ..................................... 47/58.1 SC
See application file for complete search history.

(56) References Cited

U.S. PATENT DOCUMENTS

| | | | | |
|---|---|---|---|---|
| 5,087,508 A | * | 2/1992 | Beck | G09F 7/002 40/454 |
| 5,725,869 A | * | 3/1998 | Lo | A61K 9/1617 424/401 |
| 2003/0012947 A1 | * | 1/2003 | Carn | A61F 7/02 428/321.5 |
| 2004/0202615 A1 | * | 10/2004 | O'Brien | A01N 25/08 424/46 |
| 2005/0120626 A1 | * | 6/2005 | Prescott | A01G 9/26 47/81 |
| 2007/0113500 A1 | * | 5/2007 | Zhao | C04B 20/1029 52/306 |
| 2007/0154560 A1 | * | 7/2007 | Hyon | A61K 9/1647 424/489 |
| 2008/0276530 A1 | * | 11/2008 | Trabka | A01G 9/028 47/86 |

(Continued)

OTHER PUBLICATIONS

Beyza Beyhan et al., "Root zone temperature control with thermal energy storage in phase change materials for soilless greenhouse applications", Jul. 2013, Energy Conversion and Management, 74 (2013), 446-453, 8 pages.*

*Primary Examiner* — Monica Wlliams
(74) *Attorney, Agent, or Firm* — Greer, Burns & Crain, Ltd.; Gregory P. Einhorn (57) ABSTRACT

The invention provides improved compositions and methods for growing and cultivating plants, wherein the compositions and methods comprise placing phase change materials (PCMs) close to, in contact with, or substantially in contact with, a plant root system, a plant pot or a plant soil (containing plant roots) to absorb the heat from the day and release it at night.

23 Claims, 8 Drawing Sheets

(56) References Cited

U.S. PATENT DOCUMENTS

2009/0227451 A1* 9/2009 Rose ................. A01C 1/06
504/100

* cited by examiner

ROOTZONE HEATING FOR ENERGY CONSERVATION USING LATENT HEAT STORAGE

TECHNICAL FIELD

This invention generally relates to agriculture, horticulture, thermoregulation, thermal protection and insulation, and nucleating agents. In particular, in alternative embodiments, the invention provides improved compositions and methods for growing and cultivating plants, wherein the compositions and methods comprise placing phase change materials (PCMs) close to, in contact with, or substantially in contact with, a plant root system, a plant pot or a plant soil (containing plant roots) to absorb the heat from the day and release it at night.

BACKGROUND

The benefits of root zone heating to help extend a plant's growing season or increase plant yield have been recognized and employed by gardeners for centuries (3). Growers have devised hundreds of methods to keep plant roots warm and looked for ways to heat the ambient air for plant foliage as well. The reasons for keeping roots and foliage warm might seem obvious, but the physiological processes occurring in the root zone are quite complex and affect the growth and development of plants profoundly.

Every physiological and developmental process in a plant has an optimum temperature for different species. For example, root initiations for semi-tropical plants are better at higher temperatures whereas temperature zone crops are better at lower temperatures. For example root development occurs when the soil temperature is 78° F. for poinsettias but roses only require root temperatures of 56° F. (4).

Research has shown that the optimum medium root zone temperature for propagating temperate plants ranges between 18-25 C (65 and 77 F) and 25-30 C (72-84 F) for warm/tropical climate species (5). Various studies evaluating the impact of changing root zone temperatures on crop growth have indicated that response depends on many factors including air temperature, light intensity and the species involved. Other researchers have reported that low temperatures in the root zone reduces stem elongation in *Dendranthema* plants (6), and flower formation in cucumber (7). Sandwell, (5) observed that root-zone heating increased tomato yield, especially under low night air temperatures of 9° C. Gosselin and Trudel, (8) found that maximum tomato yields were obtained at a night air and root-zone temperature combination of 18° C. and 24° C., respectively. Piore et al. (9) showed that when the root-zone temperature in *Ricinus communis* was decreased below a threshold value, leaf growth occurred preferentially at night and was strongly inhibited during the day.

Tomatoes are a widely used vegetable which are utilized fresh or as a processed product. Tomatoes require soil temperatures above 55 F and should be transplanted in the field when the soil temperatures reach 65° F. and daytime air temperatures average 55° to 60° F. The major impact of transplanting to cold soils is an inhibition of growth in general but root growth in particular due to low phosphorous (P) uptake. This is due mainly to the fact that cold soils slow the activity of microorganisms that place phosphorous (P) in solution thereby slowing diffusion to roots retarding root growth. Because root growth is critical to plant establishment a high phosphorous (P) containing starter solution is recommended.

For root zone temperature management one of the best arrangements for the plants growing inside of a greenhouse is to allow the plant container to rest directly on the concrete floor with nothing above it to hinder light penetration. One of the advantages of the pots being placed directly on the concrete floor is that the concrete will act as a thermal buffer with its "sensible heat" to keep the soil in the pot from cooling down during the night.

However, optimization of space and worker discomfort from stooping to the ground has led to most plants being elevated on benches or racks and therefore not resting on the concrete floor which would act as a temperature moderator at night to the soil in the pot. Greenhouse spacing is often limited and many ingenious methods to optimize the premium space have been developed. These methods include systems of racks, hanging baskets and moveable platforms known as roll-out benches (1). Therefore since fewer plants and their containers are not being placed directly on the concrete floor to take advantage of the thermal mass inertia of the concrete that is heated during the day a new viable approach is needed to keep the root system warm. Previous approaches to root zone heating have included heating underlayments. These underlayment systems involve electric heating pads placed under the pots of a system pumping a heated transfer fluid underneath the pots. These are heating systems that are costly to install and are not passive but require external fuel or electricity.

Phase change materials (PCMs) have been used in greenhouses, but only to control the whole greenhouse temperature, e.g., just like current greenhouse central heating and cooling systems. Levav and Zamir (11) reported that the use of PCMs in greenhouses achieved the required air temperature without increase in the relative humidity. However, the cost of the amount of PCM was too high. Kurklo (12) reported on a system that consisted of cans filled with PCM and hot daytime air was passed over them and then interior air was passed over the cans at night to maintain warmth. The air temperature was able to increase up to 15° F. One study that involved 13.5 tons of PCM in a greenhouse showed an 80% reduction in propane gas when compared to a similar neighboring greenhouse (13). In another design and experimental study the researchers showed a 40% reduction in heating load and a 30% energy savings (14). The conclusion is that PCMs can be used effectively in greenhouses for energy reduction. However, the amount of PCM is high if it is being used to thermally regulate the entire structure.

Figure 1:
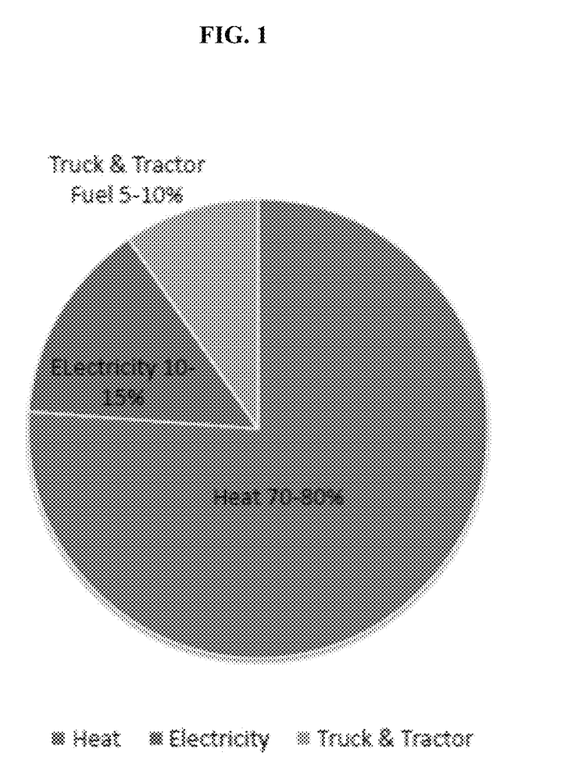
FIG. 1 illustrates the relative percentage of different sources of energy consumption used in agricultural greenhouse operations as a percent of total energy used.

In most agricultural greenhouse operations labor is the largest expense with energy consumption being the second largest expense. In traditional greenhouse operations space heating composes 70% to 80% (see FIG. 1) of the total energy used (1) Greenhouses consume large amounts of energy for heating and cooling. A greenhouse heating load is the greatest at night. A central heating system for a greenhouse heats the whole greenhouse.

Many plant stems and leaves can tolerate cooler temperatures as long as their root system remains warmer. There are approaches that use underlayment heating systems to heat just the root system and not the entire greenhouse. These approaches involve an electrical resistant underlayment or heating a fluid and pumping it under the plants and pots in order to keep the roots warm and not warming the entire greenhouse.

It is possible to grow many summer plants in 45° F. ambient air as long as the root zone is in the 70 s. Root zone temperature is more critical than leaf temperature in achieving good plant growth. The biochemical processes that sustain a healthy plant are based on the root zone environment. As long as the leaf tissue does not freeze or fall below 40° F. for sustained periods and the root zone stays in the 65° to 80° F. range, you can grow many summer plants in an ambient temperature of 45° F.

SUMMARY

In alternative embodiments, the invention provides compositions and methods for growing and cultivating plants, wherein the compositions and methods comprise placing phase change materials (PCMs) close to, in contact with, or substantially in contact with, a plant root system, a plant pot or a plant soil (containing plant roots) to absorb the heat from the day and release it at night.

In alternative embodiments, the invention provides compositions and methods for growing or cultivating a plant, wherein the method comprises placing a phase change materials (PCM) or a composition comprising a PCM close to, in contact with, or substantially in contact with, a plant root system, a plant pot or a plant soil (containing plant roots).

In alternative embodiments, phase change material (PCM) used in compositions and methods of the invention comprise fats, animal fats, vegetable oils, a salt, a salt hydrate, a petroleum derived alkane (e.g., a polyalkane, a paraffin), a fatty acid, a fatty acid ester, or any combination thereof. The fatty acids can comprise: a short-chain fatty acid (SCFA), or a fatty acids with an aliphatic tail of fewer than six carbons, or a butyric acid; or a medium-chain fatty acids (MCFA), or a fatty acid with an aliphatic tails of about 6 to 12 carbons, or 2, 3, 4, 5, 6, 7, 8, 9, 10, 11 or 12 carbons; a long-chain fatty acid (LCFA), or a fatty acid with an aliphatic tail of between 13 to 21 carbons, or 13, 14, 15, 16, 17, 18, 19, 20 or 21 carbons; or, a very long chain fatty acid (VLCFA), or a fatty acids with an aliphatic tails longer than 22 carbons, or 22, 23, 24, 25, 26, 27, 28, 29, 30, 31, 32, 33, 34, 35 or 36 or more carbons; or any combination thereof, and optionally the fatty acid is a saturated or an unsaturated fatty acid, and optionally the fatty acid is: a myristoleic acid or 9-tetradecenoic acid; a palmitoleic acid or 9-hexadecenoic acid; a sapienic acid, an oleic acid; an elaidic acid; a vaccenic acid; a linoleic acid; a linoelaidic acid; an arachidonic acid, or any combination thereof. In alternative embodiments, phase change material (PCM) used in compositions and methods of the invention comprise lauryl laurate, octyl palmitate, methyl palmitate, methyl stearate, methyl myristate, methyl lauryl, lauryl alcohol and decanol; and organic nucleating agents such as stearyl stearate and lauryl stearate.

In alternative embodiments, the invention provides products of manufacture, a plant pot or a container comprising a phase change materials (PCM) or a composition, wherein the PCM is positioned in the product of manufacture, plant pot or container to be approximate to, close to, in contact with, or substantially in contact with, a plant root system, or soil containing a plant root system, or a plant pot or a plant soil containing plant roots. The products of manufacture, plant pots or containers can comprise a plurality of PCM-filled Microspheres and/or Macrospheres.

In alternative embodiments, the invention provides methods for growing or cultivating a plant, comprising use of a product of manufacture, a plant pot or a container of the invention.

The details of one or more embodiments of the invention are set forth in the accompanying drawings and the description below. Other features, objects, and advantages of the invention will be apparent from the description and drawings, and from the claims.

All publications, patents, patent applications cited herein are hereby expressly incorporated by reference for all purposes.

BRIEF DESCRIPTION OF THE DRAWINGS

The drawings set forth herein are illustrative of embodiments of the invention and are not meant to limit the scope of the invention as encompassed by the claims.

Like reference symbols in the various drawings indicate like elements.

Reference will now be made in detail to various exemplary embodiments of the invention, examples of which are illustrated in the accompanying drawings. The following detailed description is provided to give the reader a better understanding of certain details of aspects and embodiments of the invention, and should not be interpreted as a limitation on the scope of the invention.

DETAILED DESCRIPTION

In alternative embodiments, the invention provides improved methods for growing and cultivating plants, wherein the method comprise placing phase change materials (PCMs) are close to, in contact with, or substantially in contact with, a plant root system, a plant pot or a plant soil (containing plant roots) to absorb the heat from the day and release it at night.

In alternative embodiments, any PCM can be used to practice this invention, e.g., PCMs used to practice this invention can comprise inorganic or organic phase change materials. PCMs used to practice this invention can comprise for example: a salt, a salt hydrate, a petroleum derived alkane (e.g., a polyalkane, a paraffin), a fatty acid, a fatty acid ester, or a combination thereof. PCMs used to practice this invention can comprise fat and oil derivatives (e.g., from Renewable Alternatives (Tuscaloosa, Ala.), salt hydrates and/or paraffin products. Fat and oil products are able to provide price:performance characteristics superior to paraffin PCM chemicals because 1) the natural fats and oils are available at relatively low prices and 2) multiple reaction-modification schemes provide many degrees of freedom to produce a variety of premium products. The vast majority of the mass in fats and oils are 14, 16, and 18 carbon fatty acids. These chemical building blocks are available at concentrations considerably greater than any particular n-paraffin is available in crude oil. In addition, fats and oils have "built-in" functional groups (ester bonds, carbon-carbon it bonds) that provide reactive sites for targeted chemical modification.

Practicing the compositions and methods of the invention can conserve space heating energy one approach can be through root zone heating. Practicing the compositions and methods of the invention involves just heating the roots of a plant, and not the entire greenhouse. By practicing the compositions and methods of the invention, the air temperature can be lower than the root zone temperature of a plant, thus reducing energy costs significantly. Some of our calculations using the proposed approach in this invention estimate a 50% energy reduction.

Root Zone Heating

Practicing the compositions and methods of the invention can reduce energy consumption in an agricultural greenhouse or equivalent building or system by using a completely passive system to capture the heat from the day and releasing the heat at night into the root zone. In alternative embodiments, this passive thermal storage system comprises the use of Phase Change Materials (PCMs) made from animal fats and vegetable oils. In alternative embodiments, no external man-made source of electricity or heat is needed.

Practicing the compositions and methods of the invention can maintain the plants or their roots at the temperature of their "comfort zone" where they are most comfortable. Practicing the compositions and methods of the invention can thus minimize plant stress. Practicing the compositions and methods of the invention can maintain a root zone in a consistent environment where temperature, water and aeration remain within optimal levels; the plant can then be stress-free. Practicing the compositions and methods of the invention keep root environments from fluctuating constantly. Practicing the compositions and methods of the invention can keep root zone environments maintained consistently in the comfort zone, thus, plants become more photosynthetically efficient, and can use energy they produce to focus on efficient growth and reproduction. As the plants use energy more efficiently, they begin to process nutrients better and they use light and water more efficiently.

Practicing the compositions and methods of the invention can maintain temperature, which impacts soil biology by promoting the growth of beneficial soil microbes, bacteria and fauna. Practicing the compositions and methods of the invention can promotes or allows roots to uptake nutrients and water by root cells, e.g., by promoting the reproduction of root cells. Practicing the compositions and methods of the invention can maintaining consistent temperature levels in the root zone to keep both the biological elements and the roots in a stress-free condition and allows plants to focus on plant growth and reproduction.

Practicing the compositions and methods of the invention can maintain temperature to promote root growth and function. Practicing the compositions and methods of the invention can allow roots to do most of their development at night when the green sections of the plant are not as active and any excess sugar stored during the day can be distributed to the roots. Practicing the compositions and methods of the invention can allows roots to function more efficiently because they are warm instead of cool. Plants also grow better when their average 24 hour root temperature is constant rather than fluctuating (2).

Practicing the compositions and methods of the invention can promote seeds to germinate earlier, and can promote higher quality crops via the invention's root zone heating. Just by maintaining the roots at the ideal temperature the greenhouse air temperature can be lowered by 10° F. or more (3). This lower air temperature results in less heat loss because of a lower temperature difference between the outside air and the inside greenhouse air temperature and also results in less energy needed to bring the entire air and soil temperature up.

Phase Change Material Technology

Practicing the compositions and methods of the invention incorporates the use of "phase change material" (PCM), and any PCM can be used, e.g., any material that uses phase changes (e.g., melting) to absorb or release relatively large amounts of latent heat at relatively constant temperature. In alternative embodiments, PCMs used to practice this invention comprise e.g., fats, animal fats, vegetable oils, a salt, a salt hydrate, a petroleum derived alkane, a fatty acid, a fatty acid ester, or any combination thereof 1. Bartok, J., W. *Energy Conservation for Commercial Greenhouses*. s.l.: PALS Publishing, 2001. ISBN: 0-935817-74-3.
2. Saffell, B. www.mayhillpress.com/start.html. [Online] May Hill Press, November 21, 09. [Cited: Jul. 23, 2012.]
3. Perkins, D. Is Root Zone Heating Really Necessary? Part one—The Basics. www.maximumyield.com. [Online] Mar. 1, 2012. [Cited: Jul. 23, 2012.]
4. Christenbury, G. D. *Energy Management with Root-Zone Heating*. Cooperative Extension Service, Clemson University. October 1990.
5. Jones, D. A. G., Sandwell, I. and Talent, C. J. W. THE EFFECT OF SOIL TEMPERATURE WHEN ASSOCIATED WITH LOW AIR TEMPERATURES ON THE CROPPING OF EARLY TOMATOES. *Acta Hort. (ISHS)*. 1978, Vol. 76, pp. 167-172.
6. Davies, W. J., Thompson, D. S. and Taylor, J. E. Manipulation of growth of horticultural crops under environmental stress. *Genetic and Environmental Manipulation of Horticultural Crops*. 1998, pp. 157-174.
7. Moon, J. H., Kang, Y. K. and Suh, H. D. EFFECT OF ROOT-ZONE COOLING ON THE GROWTH AND YIELD OF CUCUMBER AT SUPRAOPTIMAL AIR TEMPERATURE. *Acta Hort. (ISHS)*. 2007, 761, pp. 271-274.
8. GOSSELIN A., TRUDEL M. J. Interactions between air and root temperatures on greenhouse tomato. I: Growth, development, and yield. *Journal of the American Society for Horticultural Science*. 1983, Vol. 108, 6, pp. 901-905.
9. POIRÉ, R., SCHNEIDER, H., KUHN, A. J., THORPE, M. R., SCHURR, U., WALTER, A. Root cooling strongly affects diel leaf growth dynamics, water and carbohydrate relations in *Ricinus communis. Plant, Cell & Environment pages*. March 2010, Vol. 33, 3, pp. 408-417.
10. Hvoslef-Eide, A. K. The effect of temperature, daylength and irradiance on the growth of mother plants of *Nephrolepis exaltata* (L.) Schott and on the subsequent growth in vitro of runner tip explants. *Scientia Horticulturae*. June 1991, Vol. 47, 1-2, pp. Pages 137-147.
11. Levav, N., Zamir, N. Phase change materials for heat storage in greenhouse. *REUR technical series L:greenhouse heating with solar energy*. s.l.: CNRE, 1987.

12. Kurklo, A. Energy storage applications in greenhouses by means of phase change materials: a review. *Renew Energy.* 13 1, 1998, pp. 89-103.
13. Song, Hhyum-Kasp. *Utilization of latent heat storage materials for the high concentrated thermal energy storage.* 1988. Report no. 1988.5 19990.5.
14. Baille, A., Boulard, T. *Phase change material for heat storage in greenhouse.* s.l.: REUR Technical Series1. Greenhouse heating with solar energy, 1987.
15. John W. Bartok, Jr. *Energy Conservation for Commercial Greenhouses.* Ithaca, New Youk: Natural Resource. Agriculture, and Engineering Service (NRAES) Cooperative Extension, 2001.

The following examples, and the figures, are intended to clarify the invention, and to demonstrate and further illustrate certain preferred embodiments and aspects without restricting the subject of the invention to the examples and figures.

EXAMPLES

Example 1

Use of Phase Change Materials to Enhance Plant Growth

This example shows the effectiveness of methods of the invention for growing plants. In alternative embodiments of this invention, phase change materials (PCMs) are placed in contact with plant pots/soil to absorb the heat from the day and release it at night.

We evaluate two plant species: Diffengachia (*Dieffenbachia maculate*) and Tomato (*Lycopersicon esculentun*). Diffenbachia is a tropical foliage ornamental with large variegated leaves that is grown as a houseplant. However, these plants are among the most energy consuming of all greenhouse crops to produce. Diffenbachia has been shown to respond to bottom heat in prior studies. This previous research demonstrated an increase in the rate of uptake of nutrients from the potting medium and the resulting plant growth was comparable to plants grown in higher air temperatures without bottom heat (10).

Figure 2:
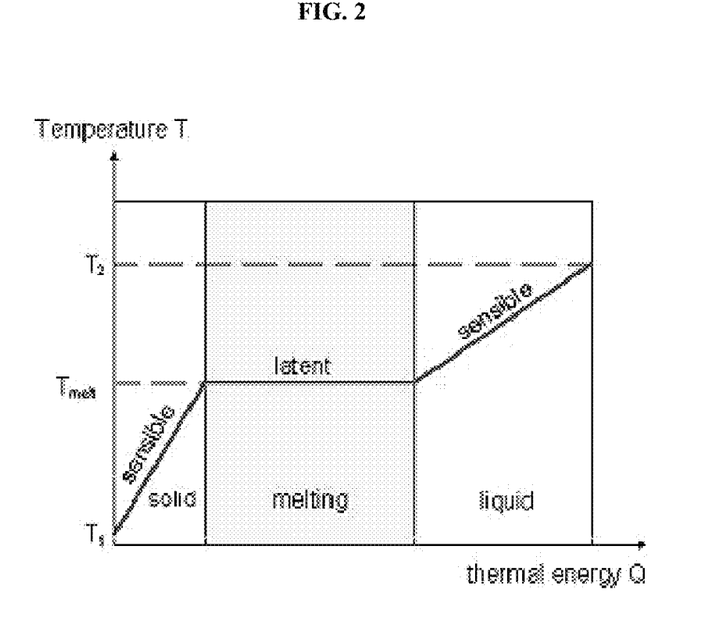
FIG. 2 illustrates a simple phase diagram showing a material heating up until it reaches its melting point, as discussed in Example 1, below.

FIG. 2 illustrates a simple phase diagram showing a material heating up until it reaches its melting point. During the melt the temperature remains constant even though more heat is being added to the system. After the material is fully melted then the temperature will start to rise again. Water has a sensible heat of 4.18 J/g*C. This means that if you want to heat 1 gram of water up 1 degree C. then you have to supply 4.18 J of energy. If you want to cool 1 gram of water down 1 degree C. then you have to do the opposite and remover 4.18 J of energy. However, if you drop the temperature from 1° C. to 0° C. and water freezes (goes through a phase change) then you would have to remove more than 4.18 J/g. You would have to remove over 333 J/g. This large amount of energy needed to go through a phase change is referred to as latent heat. Other materials such as waxes, salts, fats and oils also go through phase changes at various temperatures and have large latent heats associated with them.

Figure 3:
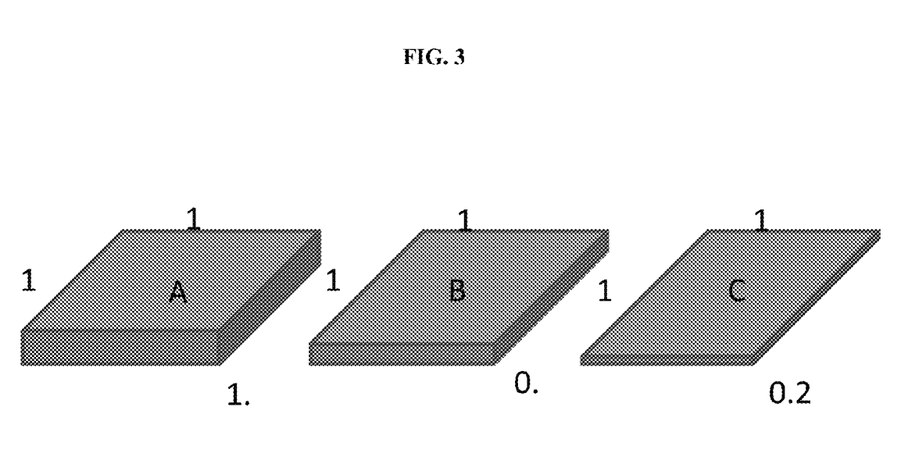
FIG. 3 illustrates three different exemplary size HDPE panels, as discussed in Example 1, below.

Exemplary compositions of the invention comprise: PCM-filled Flat High-density polyethylene (HDPE; or polyethylene high-density (PEHD))) Panels, or Shape Conformed Panels, or Double Walled Pots. Exemplary compositions of the invention comprise different types of PCM containers, and can include but are not limited to, Flat HDPE Panels, Shape Conformed Panels, and Double Walled Pots. FIG. 3 illustrates three different exemplary size HDPE panels.

Figure 4:
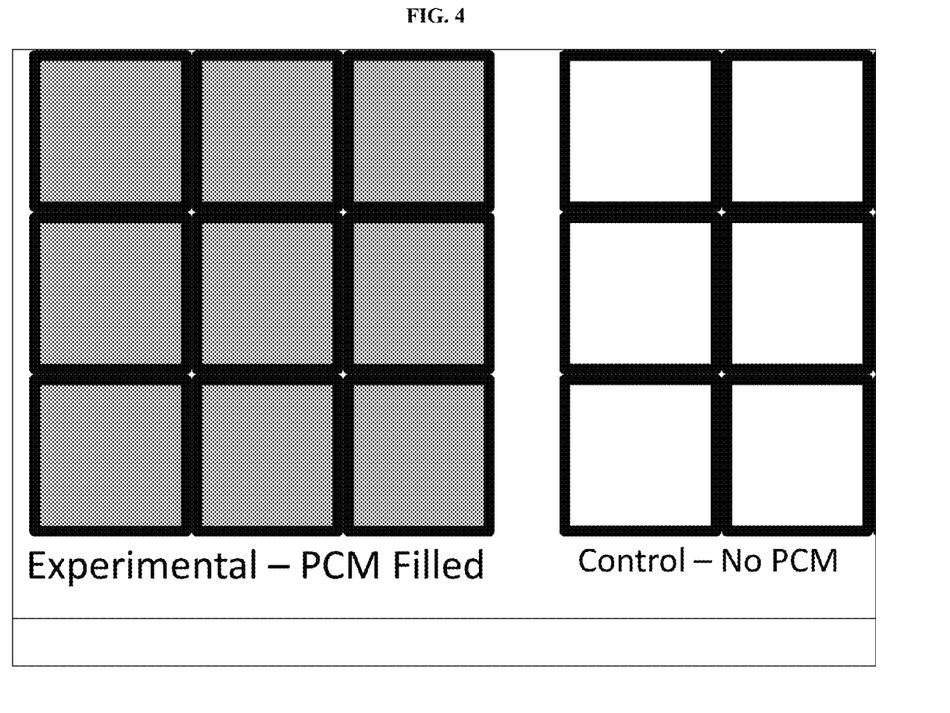
FIG. 4 illustrates exemplary panels filled with the PCM temperature transition compositions of interest, with control panels, as discussed in Example 1, below.

In one embodiment, a phase change material (PCM) containment housing is a Flat HDPE panel. There can be 3 HDPE panel sizes with different thicknesses. They can be A.) 12"×12"×1' and B.) 12"×12"×0.5' and C.) 12"×12"×0.25.' See FIG. 3. Nine of each size of these panels can be produced and filled with the PCM temperature transition materials of interest (Total=27 for experimental panels); and another set of panels, e.g., nine panels, where each of these panels are produced to serve as controls (Total=27 for controls panels); as illustrated in FIG. 4. These 9 panels are filled with PCM and 9 empty panels will be positioned in two 3×3 grids. This can be done for all 3 sizes: A.) 12"×12"×1' and B.) 12"×12"×0.5' and C.) 12"×12"×0.25.' This 3×3 grid can be placed on a table in the environmental chamber with growing pots and propagation pots placed on top of them. The experimental panels and control panels can be monitored together.

Figure 5:
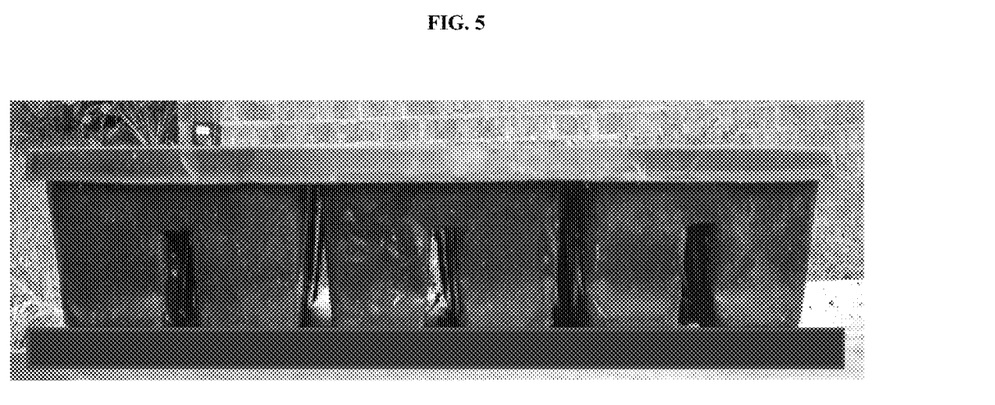
FIG. 5 illustrates propagation trays with an envisioned flat HDPE PCM panel underneath it, as discussed in Example 1, below.

FIG. 5 illustrates propagation trays with an envisioned flat HDPE PCM panel underneath it. The envisioned HDPE PCM panel is shown as the RED rectangle beneath the propagation trays.

Figure 6:
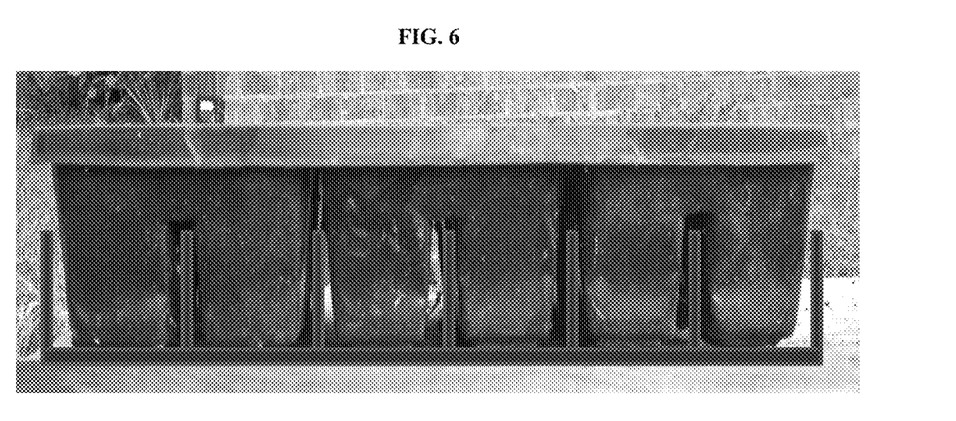
FIG. 6 illustrates exemplary Shape-Conformed Panels of the invention, e.g., where a second PCM containment housing conforms around the vertical spaces between the cells of the propagation trays, as discussed in Example 1, below.

In one embodiment, the invention provides Shape Conformed Panels, e.g., where a second PCM containment housing conforms around the vertical spaces between the cells of the propagation trays as shown in FIG. 6. These shape conformed panels can be made of HDPE as described in the above "Flat HDPE Panel" section. Alternatively these shape conformed panels can be made of a multi layered film that is strong and flexible. FIG. 6 illustrates propagation trays with an envisioned shape conformed PCM panel underneath. The envisioned shape conformed panel is shown in RED beneath the propagation trays.

Figure 7:
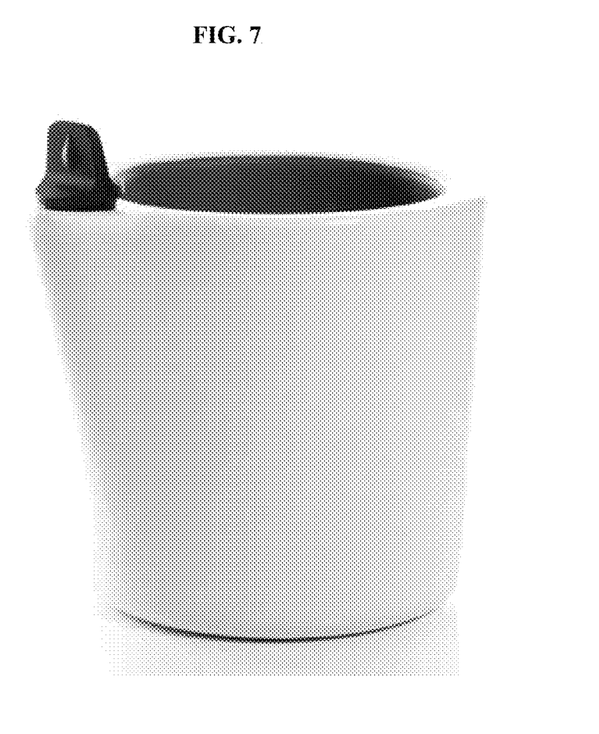
FIG. 7 illustrates an exemplary planting pot of the invention being lowered into a double walled PCM container, as discussed in Example 1, below.

In alternative embodiments, the invention provides Double Walled Pots. In one embodiment, an effective way for thermal management of the root zone involves the placement of the plant pot into a double walled container with PCM placed between the two walls. The concept can be seen in FIG. 7. These double walled containers could be reused repeatedly for decades. FIG. 7 illustrates an exemplary planting pot being lowered into a double walled PCM container. The PCM is in the void space created between the double walls. In one alternative embodiment, the spout on the top left is used for adding and changing out the PCM.

In alternative embodiments, the invention provides compositions and products of manufacture comprising, or comprising use of, PCM-filled Microspheres and Macrospheres. In alternative embodiments, microspheres (e.g., less than about 200 microns) and macrospheres (e.g., greater than about 200 microns) are used. In alternative embodiments, these particles are mixed directly into the soil or equivalent growth medium.

Figure 8:
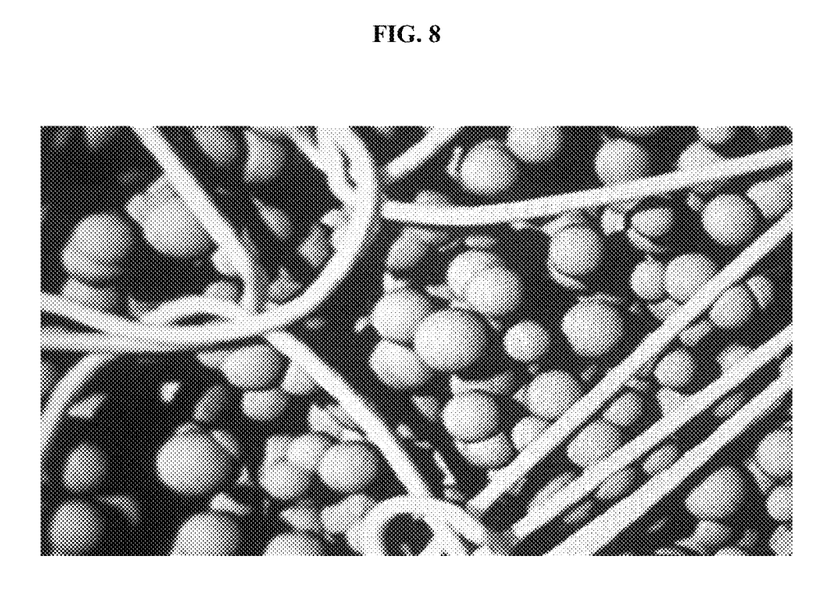
FIG. 8 illustrates a scanning electron microscopic image of exemplary microspheres used to practice this invention, as discussed in Example 1, below.

A scanning electron microscopic image of exemplary microspheres can be seen in FIG. 8. This image is of microspheres about 12 microns in size in a textile application. The textile fiber can be seen in the image too. FIG. 8 illustrates a microscopic view of microspheres with PCM inside of the core of the spheres. In alternative embodiments, the invention microencapsulates 3 different PCMs with phase transition temperatures of 75 F, 70 F. 65 F. An average particle size of 50 microns is a target. Three different PCMs are macroencapsulated with the same phase transition temperatures used in the microencapsulation. The average diameter of these macrospheres can be 250 microns.

A number of embodiments of the invention have been described. Nevertheless, it will be understood that various modifications may be made without departing from the spirit and scope of the invention. Accordingly, other embodiments are within the scope of the following claims.

What is claimed is:

1. A plant pot or a plant container comprising:
a phase change material (PCM) or a composition comprising a PCM,
wherein the plant pot or plant container is formed from or has as part of its structure or has as a structural component comprising the PCM or composition comprising the PCM,
and a sufficient amount of PCM is provided in or part of the plant pot or plant container to maintain a root zone environment having a consistent temperature environment or optimal temperature environment for a plant's root system growth or maintenance, and
wherein the PCM or the composition comprising the PCM:
(a) is positioned in as part of the plant pot or plant container to be approximate to, close to, in contact with, or substantially in contact with, the plant root system or a soil, or
(b) is present as part of or as a structural component of the plant pot or plant container,
in an amount sufficient to maintain a root zone environment having a consistent temperature environment or optimal temperature environment for the plant's root system growth or maintenance.

2. A method for:
growing or cultivating a plant with a root system,
creating an optimal environment for the growth or cultivation of a plant with a root system, or
efficiently growing or cultivating a plant,
wherein the method comprises:
cultivating or growing the plant in the plant pot or the plant container of claim 1 under conditions conducive to the plant's growth, maintenance or reproduction.

3. The plant pot or the plant container of claim 1, wherein the phase change material (PCM) comprises fats, animal fats, vegetable oils, a salt, a salt hydrate, a petroleum derived alkane, a fatty acid, a fatty acid ester, or any combination thereof.

4. The plant pot or the plant container of claim 3, wherein the fatty acid comprises: a short-chain fatty acid (SCFA), or a fatty with an aliphatic tail of fewer than six carbons, or a butyric acid; or a medium-chain fatty acids (MCFA), or a fatty acid with an aliphatic tails of about 6 to 12 carbons; a long-chain fatty acid (LCFA), or a fatty acid with an aliphatic tail of between 13 to 21 carbons; or, a very long chain fatty acid (VLCFA), or a fatty acids with an aliphatic tails longer than 22 carbons, or between about 22 and 36 carbons; or any combination thereof.

5. The plant pot or the plant container of claim 4, wherein the fatty acid is a saturated or an unsaturated fatty acid.

6. The plant pot or the plant container of claim 4, wherein the fatty acid is: a myristoleic acid or 9-tetradecenoic acid; a palmitoleic acid or 9-hexadecenoic acid; a sapienic acid, an oleic acid; an elaidic acid; a vaccenic acid; a linoleic acid; a linoelaidic acid; an arachidonic acid, or any combination thereof.

7. The plant pot or the plant container of claim 4, wherein the fatty acid is: a fatty acid with an aliphatic tail having 13, 14, 15, 16, 17, 18, 19, 20 or 21 carbons; or, a fatty acid with an aliphatic tail having 22, 23, 24, 25, 26, 27, 28, 29, 30, 31, 32, 33, 34, 35 or 36 or more carbons.

8. The plant pot or the plant container of claim 1, further comprising a soil and a plant root system.

9. A method for growing or cultivating a plant, comprising use of a plant pot or a plant container of claim 1, wherein the plant is cultivated or grown under conditions conducive to the plant's growth, maintenance or reproduction.

10. A method for germinating a plant seed, wherein the method comprises:
cultivating the seeds in the plant pot or the plant container of claim 1 under conditions conducive for germination of the seeds.

11. The plant container or the plant pot of claim 1, further comprising or having contained therein:
a seed or a plurality of seeds from a plant with a root system; and
a soil or a growth medium.

12. The plant container or the plant pot of claim 1,
wherein the PCM or the composition comprising a PCM comprises a plurality of phase change material (PCM)-filled microspheres and/or macrospheres, wherein the microspheres and/or macrospheres encapsulate the PCM.

13. The plant pot or the plant container of claim 12, wherein the microsphere and/or the macrosphere comprises or is filled with two or more different PCMs.

14. The plant pot or the plant container of claim 13, wherein each PCM has a different phase transition temperature.

15. The plant pot or the plant container of claim 14, wherein the PCM-filled or PCM-comprising microspheres microencapsulate 3 different PCMs with phase transition temperatures of 75° F., 70° F. and 65° F., or the PCM-filled or PCM-comprising macrosphere encapsulates 3 different PCMs with phase transition temperatures of 75° F., 70° F. and 65° F.

16. The plant pot or the plant container of claim 12, wherein the microspheres average particle size is about 50 microns.

17. The plant pot or the plant container of claim 12, wherein the macrosphere average particle size is about 250 microns.

18. The plant pot or the plant container of claim 1, wherein the plant container is an environmental chamber, a containment housing or a propagation tray.

19. The plant pot or the plant container of claim 1, wherein the container is a flat high-density polyethylene (HDPE) panel, a polyethylene high-density (PEND) panel, or a shape conformed panel.

20. The plant pot or the plant container of claim 1, wherein the container or the plant pot is double walled and the PCM or composition comprising the PCM are placed within the double wall.

21. The plant pot or the plant container of claim 1, comprising or fabricated with a containment housing or shape conformed panels comprising the PCM or composition comprising the PCM.

22. The plant pot or the plant container of claim 21, wherein the PCM containment housing is fabricated to conform around vertical spaces between cells of a propagation tray.

23. The plant pot or the plant container of claim 21, wherein the shape conformed panels are made of a multi layered film.

* * * * *